No. 665,614. Patented Jan. 8, 1901.
E. F. MAXWELL & E. E. ANGELL.
SOLE EDGE TRIMMER.
(Application filed June 23, 1900.)
(No Model.)
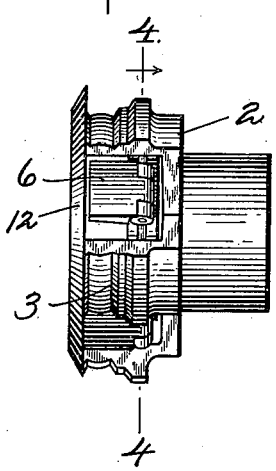
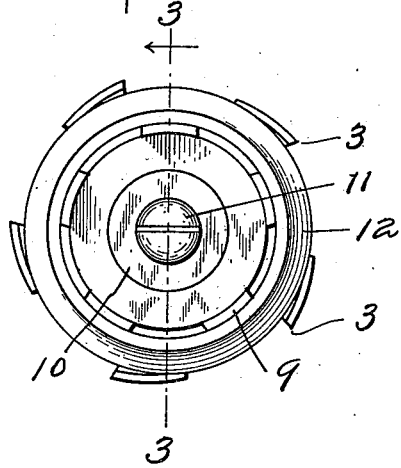
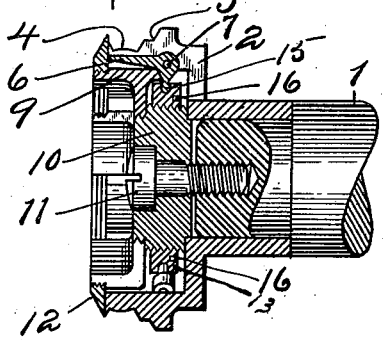
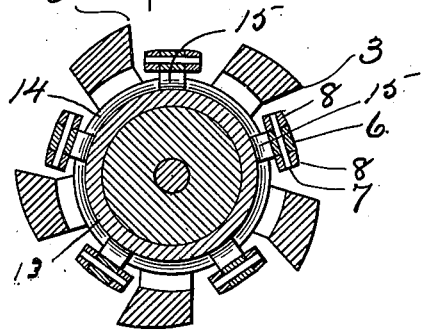
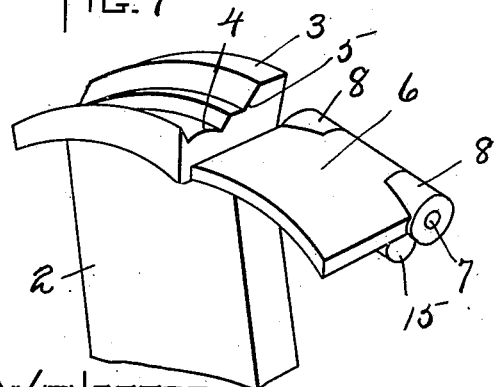
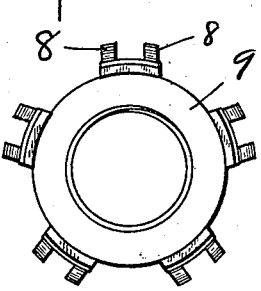
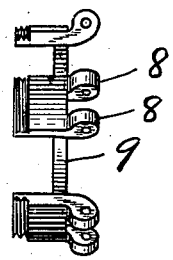
WITNESSES:
INVENTORS
E. F. Maxwell
E. E. Angell
by Wright Brown & Quinby
Attys.
THE NORRIS PETERS CO., PHOTO-LITHO., WASHINGTON, D. C.

UNITED STATES PATENT OFFICE.

EDWIN F. MAXWELL, OF SAN FRANCISCO, CALIFORNIA, AND EDWIN E. ANGELL, OF SOMERVILLE, MASSACHUSETTS.

SOLE-EDGE TRIMMER.

SPECIFICATION forming part of Letters Patent No. 665,614, dated January 8, 1901.

Application filed June 23, 1900. Serial No. 21,262. (No model.)

*To all whom it may concern:*

Be it known that we, EDWIN F. MAXWELL, of San Francisco, county of San Francisco, State of California, and EDWIN E. ANGELL, of Somerville, county of Middlesex, State of Massachusetts, have invented certain new and useful Improvements in Sole-Edge Trimmers, of which the following is a specification.

This invention relates to sole-edge trimmers having an edge-guard to regulate the depth of cut of the edge-trimming portions of the cutter, such as is described in Patent No. 625,115, granted to E. F. Maxwell, May 16, 1899. In the said patent the sections of the edge-guard were independently adjustable and separate adjustment was required for each section when it was desired to vary the depth of cut.

The present invention has for its object to provide means for simultaneously adjusting the sections of the edge-guard; and to this end it consists in certain novel features of construction and arrangement, which we will now proceed to describe and claim.

Of the accompanying drawings, Figure 1 represents a side elevation of a sole-edge trimmer constructed in accordance with our invention. Fig. 2 represents a front elevation thereof. Fig. 3 represents a longitudinal section on the line 3 3 of Fig. 2. Fig. 4 represents a transverse section on the line 4 4 of Fig. 1. Figs. 5 and 6 represent detail front and side elevations of the edge-guard holder. Fig. 7 represents a detail perspective view showing the relation of the cutter and edge-guard.

The same reference characters indicate the same parts in all the figures.

Referring to the drawings, 1 represents a rotary arbor or shaft, on which is mounted a cutter 2, consisting of a hub and spider, at the ends of whose arms are the cutting portions 3 3, which trim the edge of the sole. Each cutting portion 3 itself consists of an edge-trimming part 4 and a bottom-trimming part 5.

6 6 represent a series of horizontally and forwardly projecting arms located in the spaces between the cutting members 3 3 and together constituting an edge-guard which serves to regulate the depth of cut of the cutting portions or members 3 3. The relation of the cutter and edge-guard is shown in Fig. 7, in which it is seen that the edge-guard sections 6 are located just inside of the edge-trimming portions 4 of the cutter. The several sections 6 are pivoted or hinged upon pintles 7 7 between ears 8 8, which are formed on a frame or holder 9. Said holder is screwed upon a block 10, removably attached to the arbor 1 by means of a screw 11, said block serving to clamp the cutter 2 to the arbor. The frame or holder 9 also serves as a support for the shield 12, which is screwed upon it. The block 10 is externally threaded to receive a nut or ring 13, which has a groove 14, occupied by arms 15 15, formed on the edge-guard section 6 and projecting inwardly. The ends of said arms are rounded, so as to permit the arms to have a rocking movement within the groove when the ring 13 is adjusted relatively to the pivots of the sections 6. This movement of the ring is effected by rotating the ring with a spanner fitted in holes 16 16 in the ring, said rotation screwing the ring, which has a frictional fit on the block 10, longitudinally of the cutter body and shaft. The sections of the edge-guard are thereby swung on their pivots and are simultaneously adjusted in a radial direction, so as to vary the depth of cut of the cutter 2.

We do not herein claim, broadly, the edge-guard consisting of a series of adjustable sections, together with means for simultaneously adjusting them radially toward and away from the edge-trimming portions of the cutter to vary the depth of cut, as this subject-matter is claimed in another application filed by us concurrently herewith.

We claim—

1. In a sole-edge trimmer, a rotary cutter member having edge-trimming sections, a series of guard-sections pivoted or fulcrumed between the trimming-sections, and means for swinging said guard-sections simultaneously to adjust the same radially.

2. In a sole-edge trimmer, a rotary cutter member having edge-trimming sections, a series of guard-sections pivoted or fulcrumed between the trimming-sections, each guard-section having an arm projecting inwardly from its fulcrum, and an adjusting device engaged with the arms of all the guard-sections for simultaneously adjusting the latter.

3. In a sole-edge trimmer, a rotary cutter member having edge-trimming sections, a series of guard-sections pivoted or fulcrumed between the trimming-sections, an adjusting-ring longitudinally adjustable on the cutter-body, and connections between said ring and the guard-sections whereby they are simultaneously adjusted when the ring is adjusted longitudinally.

4. In a sole-edge trimmer, a rotary cutter member having edge-trimming sections, a series of guard-sections pivoted or fulcrumed between the trimming-sections, each guard-section having an arm projecting inwardly from its fulcrum, and an adjusting-ring having a screw-thread connection with the cutter-body, whereby the ring is longitudinally adjusted, said ring being engaged with the arms of the guard-sections.

In testimony whereof we have affixed our signatures in presence of two witnesses.

EDWIN F. MAXWELL.
EDWIN E. ANGELL.

Witnesses:
C. F. BROWN,
A. D. HARRISON.